Patented Nov. 13, 1951

2,574,525

UNITED STATES PATENT OFFICE 2,574,525

REGENERATION OF SPENT ALKALI

Donald C. Bond, Northbrook, and Nelson B. Russell, Winnetka, Ill., assignors to The Pure Oil Company, Chicago, Ill., a corporation of Ohio No Drawing. Application March 4, 1944, Serial No. 525,095

4 Claims. (Cl. 23—184)

1

This invention relates to a method for removing acidic sulfur compounds from water-immiscible fluids and is more particularly concerned with regeneration of alkaline reagents which have been employed to remove mercaptans from petroleum oils.

It is now common practice to extract mercaptans and other acidic sulfur compounds from hydrocarbon fluids, particularly gasoline and similar light oil distillates, by treatment of the distillate with aqueous alkali solution containing solubility promoters. One process for extracting mercaptans from petroleum distillates is the "Mercapsol" process in which an aqueous sodium hydroxide solution, containing alkali metal naphthenates together with cresols as solubility promoters, is used. The "Mercapsol" process and the reagent used therein are disclosed in Patent #2,297,621. Other solubility promoters which are in commercial use are the alkali metal salts of low boiling fatty acids, particularly isobutyric acid.

Aqueous alkali solutions of the type just described, after they have been used to extract mercaptans from petroleum distillates, are ordinarily regenerated for re-use by steam stripping at temperatures of the order of 200–300° F. Steam stripping hydrolyzes the mercaptides, thereby releasing mercaptans which pass overhead with the steam. While this method of regeneration has proved satisfactory, the cost of the steam required for the stripping operation is relatively high.

It is an object of this invention to provide a process for removing acidic sulfur compound from hydrocarbon fluids.

It is another object of this invention to provide an improved method of regenerating alkali solutions which have been used for removing acidic sulfur compounds from hydrocarbon fluids.

It is still a further object of the invention to provide a method for regenerating used alkali solutions by means of oxygen or oxygen-containing gas.

Still another object of the invention is to provide a catalyst capable of accelerating regeneration of used alkali solutions by means of air blowing.

Other objects and advantages will be apparent from the following description of the invention.

It has now been found that regeneration of alkaline solutions which have been used for removing acidic sulfur compounds from water-immiscible fluids such as petroleum oils may be greatly accelerated by contacting the solutions with free oxygen-bearing gas, such as air, in the presence of a small amount of anthragallol (1, 2, 3 trihydroxy anthraquinone).

In accordance with the invention the hydrocarbon fluids from which it is desired to extract mercaptans or other acidic sulfur compounds are contacted with aqueous alkali solution such as aqueous sodium or potassium hydroxide containing from about 5 to 30% by weight of free alkali metal hydroxide, with or without solubility promoters, in a ratio of approximately 5 to 50% by volume of alkali solution per volume of liquid undergoing treatment. The used alkali solution is then contacted with air preferably countercurrently in a packed tower in the presence of anthragallol in an amount of from approximately .05 to 3 percent by weight of the alkali solution. The used alkali is contacted with a sufficient amount of air and for a sufficient length of time to reduce the mercaptan content to a point suitable for re-use of the solution in further extraction of mercaptans and/or other acidic sulfur compounds. The regeneration is preferably not carried to completion since the catalyst may be destroyed if all the mercaptan or other acidic sulfur compound is removed from the alkali solution undergoing regeneration thereby necessitating the replacement of the catalyst for the succeeding regeneration step. Ordinarily, we do not reduce the mercaptan sulfur content of the used alkali during regeneration below 0.2 to 0.6% by weight.

The air regeneration may be conducted at ordinary atmospheric temperatures. Temperatures between 60 and 130° F. are satisfactory. Lower or higher temperatures may be used. However, lower temperatures require longer periods for regeneration whereas higher temperatures are not desirable because of the possibility of forming undesirable oxidation by-products.

In order to demonstrate the efficacy of anthragallol, several different compounds were tested in the following manner: 1.86 cubic centimeters of normal butyl mercaptan were dissolved in 50 cubic centimeters of an aqueous sodium hydroxide solution containing 10% by weight of sodium hydroxide in order to give a solution containing 1% by weight of mercaptan sulfur. To the sodium hydroxide solution was added 0.55 grams of the desired catalyst in order to have present 1% by weight of catalyst in the solution. In some cases in order to hasten solution of the catalyst, the solution was agitated with nitrogen which had first been passed through alkaline pyrogallol solution to remove any oxygen. In some cases the entire amount of catalyst did not dissolve in the alkali solution. The solution containing the sodium hydroxide, normal butyl mercaptan and catalyst was placed in a 100 cc. graduated cylinder filled to the 75 cc. mark with No. 4 glass beads. Air was bubbled through the solution for 1 hour at the rate of 0.03 cubic feet per hour by means of a tube reaching to the bottom of the cylinder. After the solution had been blown for 1 hour with air at room temperature (approximately 75° F.) it was extracted with approximately 100 cubic centimeters of V. M. P. naphtha to remove the disulfides that had formed. The resulting naphtha containing the disulfides was treated with acidic silver nitrate to remove any unoxidized mercaptans and the solution was then analyzed for disulfides. Among the compounds tested were 1,5 dihydroxy anthraquinone; rufigallol (1, 2, 3, 5, 6, 7 hexadroxy anthraquinone) and anthragallol. The results of these tests are tabulated in the following table:

Table

| Test No. | Catalyst used in Test | g. Disulfide Sulfur found in Naphtha Solution | Per Cent by wt. of n-butyl Mercaptan Oxidized |
|---|---|---|---|
| 1 | None | 0.005 | 0.9 |
| 2 | 1,5 dihydroxy anthraquinone [1] | 0.005 | 0.9 |
| 3 | Rufigallol | 0.022 | 4.0 |
| 4 | Anthragallol | 0.150 | 27.0 |

[1] Only part went into solution.

As appears from the table, anthragallol was far superior to either 1,5 dihydroxy anthraquinone or rufigallol as an oxidation accelerator. Whereas 1,5 dihydroxy anthraquinone did not appear to have any catalytic effect on the rate of oxdiation, and rufigallol increased the percent of oxidation of normal butyl mercaptan from .9 without catalyst to 4 percent with the catalyst, the rate of oxidation increased to 27 percent with anthragallol.

It will thus be seen that a method has been devised whereby alkali solution used to remove acidic sulfur compounds such as mercaptans from petroleum distillates and other hydrocarbon fluids can be regenerated in a relatively simple and inexpensive manner and the alkali solution restored to a condition suitable for re-use. The amount of anthragallol added to the alkali will depend on the particular catalyst and to some extent upon particular regeneration conditions employed, but is ordinarily from about 0.1 to 2% by weight. The alkali solution may be repeatedly regenerated although it may be necessary to add additional anthragallol from time to time to make up for any loss and maintain the desired efficiency.

It is to be understood that the rate of air blowing used in the specific examples herein disclosed is not to be considered as the most desirable rate for commercial operation. Obviously where large scale equipment is used the rate of air blowing will considerably exceed that used in the tests. The rate of air blowing may vary within wide limits and will be adjusted in accordance with the size and type of equipment used in the regeneration step to obtain most rapid regeneration with minimum loss of solution by carry-over in the exhaust air.

In the co-pending application, Serial Number 537,969, filed May 29, 1944, there is disclosed a process for regenerating solutions which involves the oxidation of mercaptans in the presence of certain trihydroxy compounds. United States Patent 2,369,771 of April 20, 1944, to Bond, discloses the regeneration of solutions employing butyl pyrogallol.

It is claimed:

1. The process of regenerating an aqueous alkali solution containing weakly acidic sulfur compounds and a small amount of anthragallol as an oxidation promoter for catalyzing the oxidation of said weakly acidic sulfur compounds, which solution has been used to extract said weakly acidic sulfur compounds from hydrocarbon fluids comprising contacting said solution with a gas containing free oxygen to oxidize said sulfur compounds but leaving a sufficient amount of said sulfur compounds unoxidized in said solution to insure that the promoter is reduced to a non-oxidizing state and not degraded to an inactive state and removing the oxidized sulfur compounds from the solution.

2. The process in accordance with claim 1 in which the amount of anthragallol present is an effective amount in the range from 0.05 to 3 per cent, the amount of oxygen containing gas used in the regeneration being sufficient to reduce the mercaptan sulfur content in said solution to approximately 0.2 to 0.6 per cent by weight.

3. The process in accordance with claim 1 in which the anthragallol is present in an effective amount between 0.1 and 2 per cent by weight of the alkali solution.

4. The method in accordance with claim 3 in which the solution is contacted with air at substantially ambient temperature.

DONALD C. BOND.
NELSON B. RUSSELL.

REFERENCES CITED

The following references are of record in the file of this patent:

UNITED STATES PATENTS

| Number | Name | Date |
|---|---|---|
| 1,855,353 | Jacobson | Apr. 26, 1932 |
| 2,015,038 | Pevere | Sept. 17, 1935 |
| 2,315,530 | Loyd | Apr. 6, 1943 |
| 2,369,771 | Bond | Feb. 20, 1945 |

FOREIGN PATENTS

| Number | Country | Date |
|---|---|---|
| 126,544 | Hungary | Mar. 17, 1941 |